United States Patent
Moore (10) Patent No.: US 7,167,546 B2
(45) Date of Patent: Jan. 23, 2007

(54) PROVISION OF VOICE MAIL MESSAGING INDICATOR AND VOICE MAIL ACCESS SERVICES VIA COMMON INSTANT COMMUNICATIONS CLIENTS

(75) Inventor: Richard Garrett Moore, Cedar Rapids, IA (US)

(73) Assignee: MCI, LLC, Basking Ridge, NJ (US)

( * ) Notice: Subject to any disclaimer, the term of this patent is extended or adjusted under 35 U.S.C. 154(b) by 115 days.

(21) Appl. No.: 10/800,272

(22) Filed: Mar. 12, 2004

(65) Prior Publication Data

US 2005/0180548 A1 Aug. 18, 2005

Related U.S. Application Data

(60) Provisional application No. 60/544,115, filed on Feb. 12, 2004.

(51) Int. Cl.
H04M 1/64 (2006.01)
(52) U.S. Cl. ............................ 379/88.12; 379/88.11; 455/412.2; 709/206
(58) Field of Classification Search ............... None
See application file for complete search history.

(56) References Cited

U.S. PATENT DOCUMENTS

| | | | |
|---|---|---|---|
| 5,864,606 A * | 1/1999 | Hanson et al. | 379/88.18 |
| 6,707,890 B1 * | 3/2004 | Gao et al. | 379/88.12 |
| 2002/0007782 A1 | 1/2002 | Cruickshank | |
| 2004/0121762 A1 * | 6/2004 | Chou et al. | 455/413 |

FOREIGN PATENT DOCUMENTS

| | | |
|---|---|---|
| EP | 1372095 | 12/2003 |
| WO | 01/43357 | 6/2001 |

* cited by examiner

*Primary Examiner*—Gerald Gauthier (57) ABSTRACT

An approach is provided for supporting telephony services over a data network. The approach aggregate message waiting indication information from one or more voice mail systems for notifying a user of the presence of a voice mail message resident on any one of the voice mail systems. According to a user profile, a notification message is transmitted over the data network to one or more instant communication clients based upon the aggregated message waiting indication information, wherein the notification message specifies the presence of the voice mail message.

38 Claims, 7 Drawing Sheets

PROVISION OF VOICE MAIL MESSAGING INDICATOR AND VOICE MAIL ACCESS SERVICES VIA COMMON INSTANT COMMUNICATIONS CLIENTS

RELATED APPLICATIONS

This application is related to, and claims the benefit of the earlier filing date under 35 U.S.C. § 119(e) of, U.S. Provisional Patent Application filed Feb. 12, 2004 (Ser. No. 60/544,115; ), entitled "Provision of Traditional Telephone Services into Non-telephone Devices Using Instant Communications Technology"; the entirety of which is incorporated herein by reference.

FIELD OF THE INVENTION

The present invention relates to communications, and more particularly, to providing telephony services over instant communications clients.

BACKGROUND OF THE INVENTION

When developing new services, service providers are ever mindful of cost. In general, the introduction of new communication services requires a large investment in new infrastructure, not to mention development costs. Given the competitive landscape of communication services, service providers need to be more innovative in seeking new sources of revenue. It is observed that despite the popularity of the Internet and its many applications (even with Voice Over Internet Protocol (VoIP)), the development of data communications has remained largely independent from voice communications and telephony services. In other words, the advancement in services on the telephony side has not been well integrated on the data network side.

For example, voice mail service has become a staple of modern communication because of its convenience. This convenience stems from the fact that voice mails are recorded and later delivered to the intended party, thereby freeing the intended party from having to be physically present at a telephone station to receive information from a caller. However, it is imperative that the intended party somehow be made aware that a message or messages "waiting" in the voice mail system. This indication is referred to as Message Waiting Indication (MWI). Conventionally, this indication is provided on the target telephone station, in form of a tone when the handset is lifted. Also, certain sophisticated telephone stations may be equipped with an LED (Light Emitting Diode) light that flashes when a new message is waiting in the voice mail system. Apart from these conventional methods, this information is not made readily available to end users. Further, if a user possesses multiple voice mail accounts, the user must manually check each one of the telephone stations to determine whether a voice mail message exists in the respective voice mail systems. This task can be cumbersome if the user has many accounts, and thus, the user is likely to delay in retrieving voice mails. Such delay can pose negative consequences if the message is of great import.

Therefore, there is a need for supporting telephony services, such as MWI, over a data network. There is also a need to deploy a communications service that utilizes existing infrastructure. There is a further need to support a new source of revenue for service providers to bill for the telephony services.

SUMMARY OF THE INVENTION

These and other needs are addressed by the present invention, in which an approach is presented for providing a Message Waiting Indication (MWI) service to an instant communication (IC or instant messaging (IM)) client. A Service Platform communicates with one or more voice mail systems over a circuit-switched telephone system or packet-switched network to obtain MWI information corresponding to a voice mail message resident on the voice mail system. The platform utilizes a user database that stores a user profile which specifies the voice mail systems serving the called numbers of the user, as well as one or more instant communication clients that are to receive the MWI information for display. The platform supports the display of multiple notifications via a single IC client, thereby creating a convenience feature for a user who may have multiple telephones (e.g. home1, home2, cell1, cell2, office1, remote phone1) but desires to receive MWI services via one common interface. The above arrangement advantageously provides an integrated approach to telephony services using existing communication infrastructure. This approach also provides service providers with a new, viable source of revenue.

According to one aspect of the present invention, a method for supporting telephony services over a data network is disclosed. The method includes retrieving message waiting indication information from a voice mail system designated by a user. The message waiting indication information specifies existence, within the voice mail system, of a voice mail message for the user. The method also includes determining an instant communication client of the user. The method further includes forwarding the message waiting indication information over the data network to the instant communication client for display.

According to another aspect of the present invention, a computer-readable medium carrying one or more sequences of one or more instructions for supporting telephony services over a data network is disclosed. The one or more sequences of one or more instructions including instructions which, when executed by one or more processors, cause the one or more processors to perform the step of retrieving message waiting indication information from a voice mail system designated by a user, wherein the message waiting indication information specifies existence, within the voice mail system, of a voice mail message for the user. Other steps include determining an instant communication client of the user; and forwarding the message waiting indication information over the data network to the instant communication client for display.

According to another aspect of the present invention, a system for supporting telephony services over a data network is disclosed. The system includes a gateway configured to retrieve message waiting indication information from a voice mail system designated by a user, wherein the message waiting indication information specifies existence, within the voice mail system, of a voice mail message for the user, the gateway determining an instant communication client of the user. The system also includes a server configured to forward the message waiting indication information over the data network to the instant communication client for display.

According to another aspect of the present invention, a method for supporting telephony services over a data network is disclosed. The method includes aggregating message waiting indication information from one or more voice mail systems for notifying a user of presence of a voice mail message resident on any one of the voice mail systems. Also, the method includes transmitting a notification message over the data network to an instant communication client based upon the aggregated message waiting indication information, wherein the notification message specifies the presence of the voice mail message.

According to yet another aspect of the present invention, a server for supporting telephony services over a data network is disclosed. The server includes means for aggregating message waiting indication information from one or more voice mail systems for notifying a user of presence of a voice mail message resident on any one of the voice mail systems. Additionally, the server includes means for transmitting a notification message over the data network to an instant communication client based upon the aggregated message waiting indication information, wherein the notification message specifies the presence of the voice mail message.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for supporting telephony services, such as message waiting indication, over a data network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
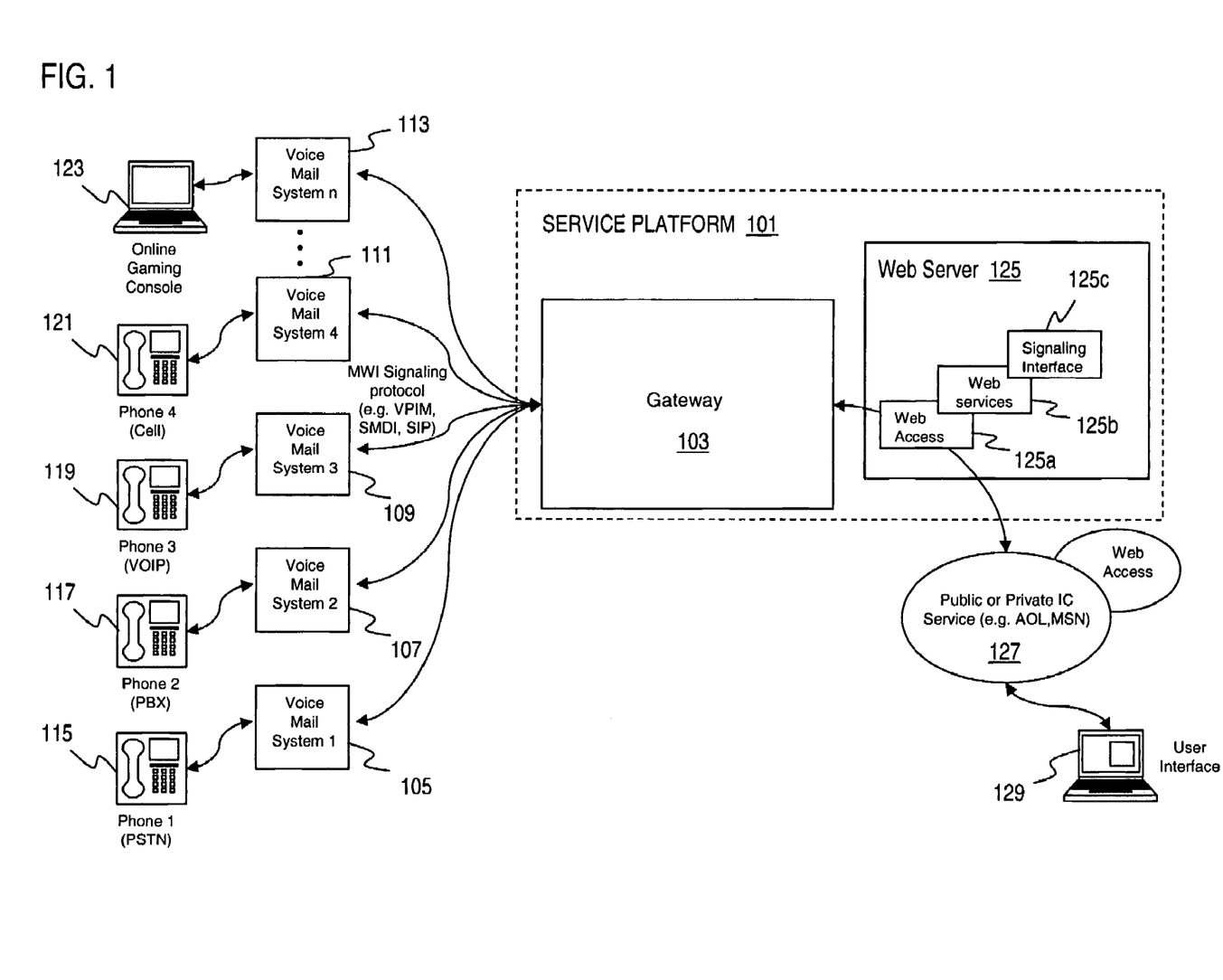
FIG. 1 is a diagram of a communication system that is capable of providing voice mail services to instant communication (IC) clients, according to an embodiment of the present invention.

FIG. 1 is a diagram of a communication system that is capable of providing voice mail services to instant communication (IC) clients, according to an embodiment of the present invention. A Service Platform 101 includes a gateway 103 that communicates with one or more voice mail systems 105–113 to obtain voice mail Message Waiting Indication (MWI) information conveyed by the MWI signaling protocol, which can include Voice Profile for Internet Mail (VPIM), Simplified Message Desk Interface (SMDI), Session Initiation Protocol (SIP), etc. The voice mail systems 105–113 can be conventional voice mail platforms that interface with a variety of telephony networks (not shown). As shown, these voice mail systems 105–113 can accommodate different types of stations originating from various networks (e.g., cellular systems, data networks, conventional telephony systems). Given the development of modern communication services, it is not uncommon that a user be associated with one or more of the stations 115–123. By way of example, phone stations 115, 117 operate over circuit switched telephone networks, such as a Public Switched Telephone Network (PSTN) or Private Branch Exchanges (PBXs); the phone station 115 can be a home phone, while the station 117 can be a work phone. In addition, the user may employ a Voice over IP (Internet) (VoIP) station 119 (e.g., at a home office). Also, the user is likely to have a cellular phone 121. Furthermore, the user may possess an online gaming console that has telephony functionalities, such that voice mail is supported.

The Service Platform 101 acts as the service control point for the many voice mail systems 105–113. Furthermore, the platform 101 provides web-based applications in support of the MWI service. As seen in FIG. 1, the Service Platform provides a web server 125 that includes a web access component 125a, a web service component 125b, and a signaling interface 125c to convey the MWI signaling to a data network 127, which can provide a public IC service or a private IC service (e.g., an enterprise scenario). Examples of IC or IM clients include products such as AMERICA ON-LINE™ Instant Messenger, and MICROSOFT® Windows Messenger.

Figure 4:
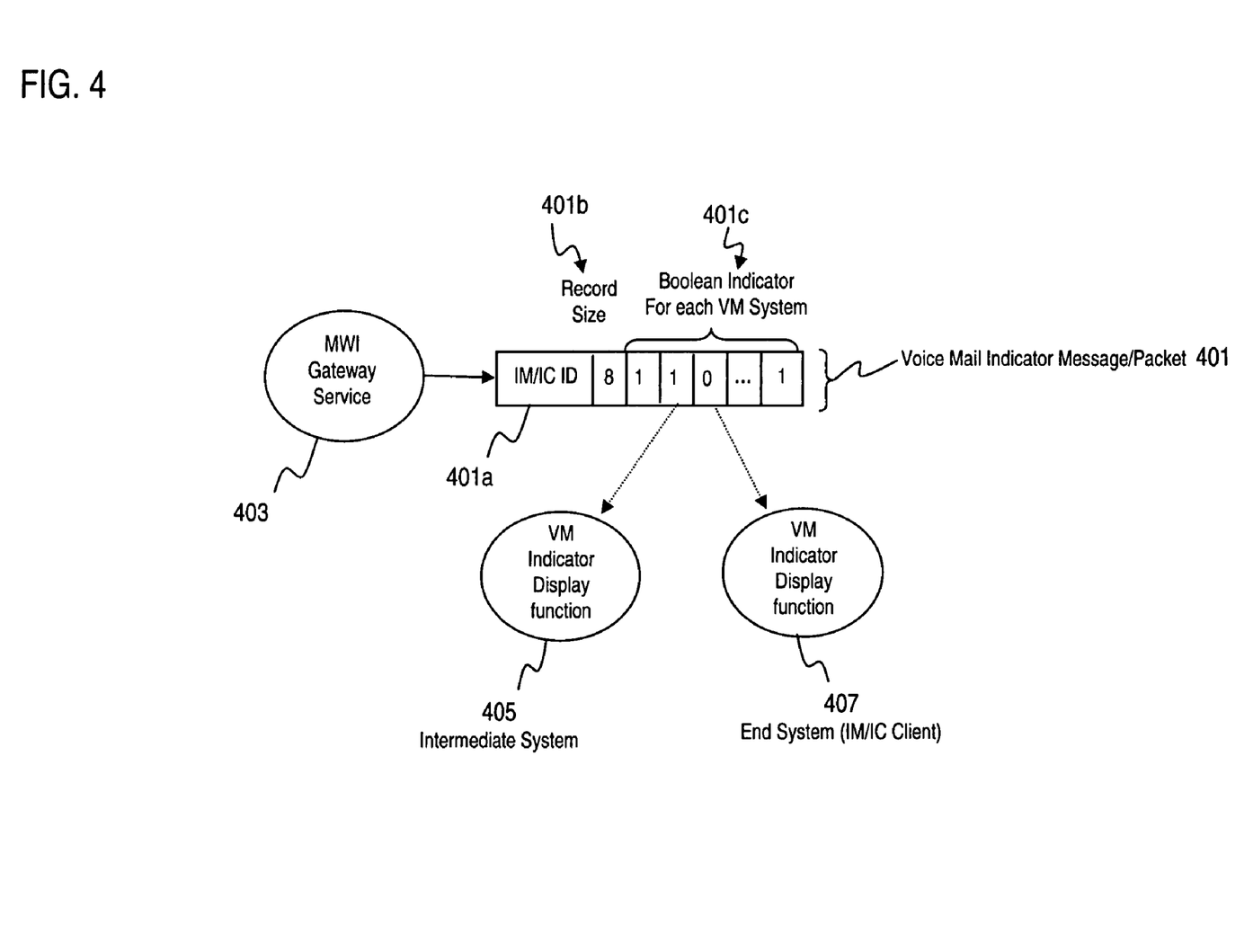
FIG. 4 is a diagram of an exemplary voice mail indicator message used to support the MWI service, according to an embodiment of the present invention.

It is recognized that IC clients are pervasive and can run on multiple types of devices, such as a personal computer, which offers a greater degree of options and services associated. An example of such services includes cataloging, storage, sorting, and retrieval of call activity or integration with other common applications such as email. In this example, the IM client resides on a host 129, which utilizes a user interface to display the MWI information, which can include an indicator, called numbers, and timestamp, etc.; such a user interface is shown in FIG. 4. The called number can be extracted from a Dialed Number Identification Service (DNIS) number obtained from a voice switch (not shown) in communication with the voice mail system. The called number can alternatively be retrieved from a billing and accounting system (not shown) for the user.

During an IM session, for example, the user is notified that a voice message directed to one of the called numbers associated with the user. The notification can take any number of forms, such as an on screen indicator that flashes, whereby the user can click on the indicator to learn of more details about the voice mail and/or permits selection of the desired voice mail system. In this manner, the user via the host 129 can communicate with the appropriate voice mail system, or otherwise, be provided with the capability to listen to the voice mail message. In this later scenario, the gateway 103 can retrieve the voice mail message and forward the message to the host 129.

Thus, the Service Platform 101 provides for the aggregation of multiple message waiting indication methods into one indicator, thereby providing the user with great convenience and efficiency. Traditionally, the user would need to check separately each of the stations 115–123 to determine whether a voice mail has been left with the corresponding voice mail systems 105–113. This manual task is time consuming and unwieldy; as a result, users may allow the voice mail messages to be stale. By contrast, the Service Platform 101 provides for one click access to multiple systems, which need not be associated or integrated. Another advantage is that, from the perspective of a service provider, this feature can be provided as a billable service.

Figure 2:
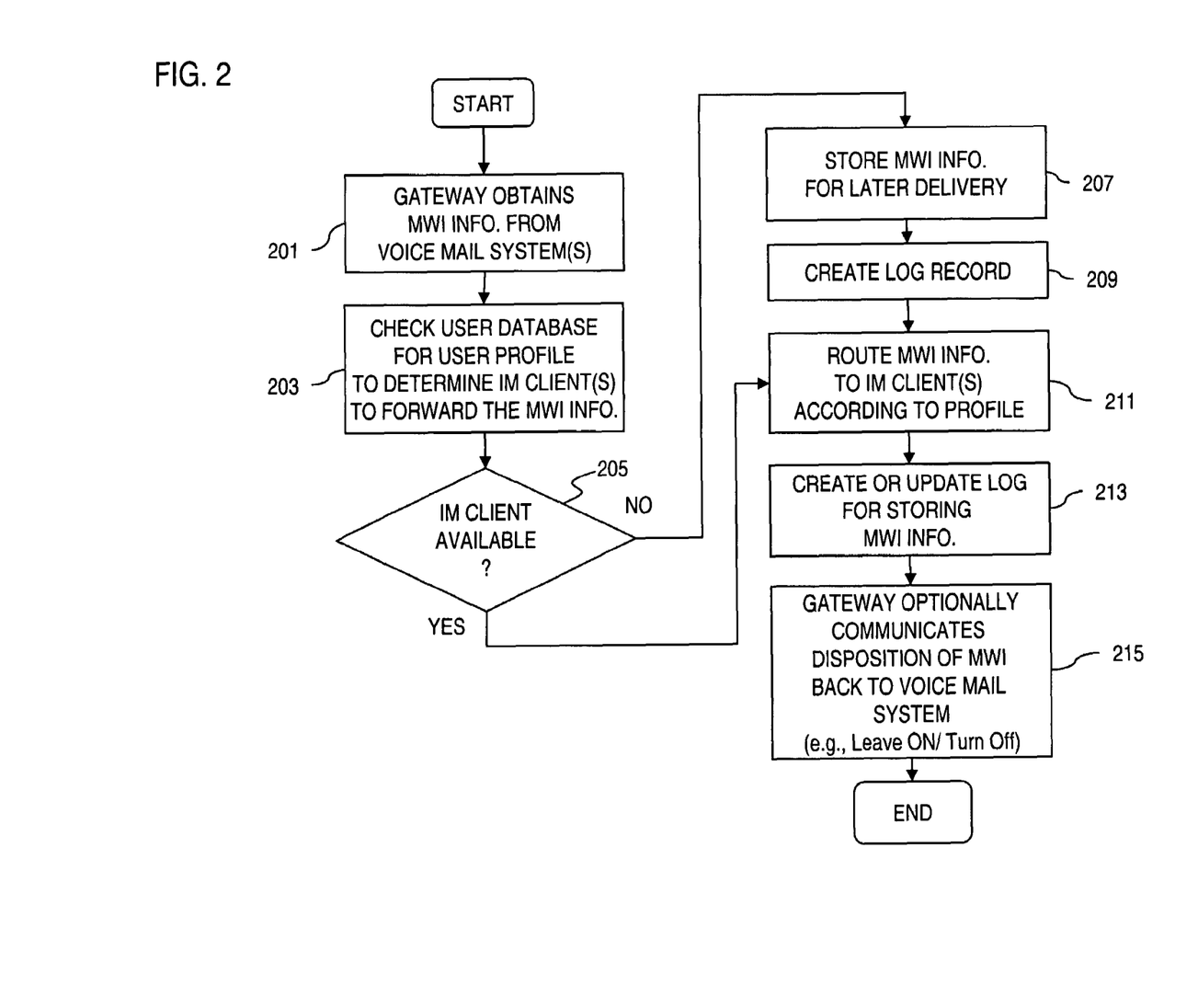
FIG. 2 is a flowchart of a process for providing Voice Mail Message Waiting Indication (MWI) service to an instant communication client, according to an embodiment of the present invention.

FIG. 2 is a flowchart of a process for providing Voice Mail Message Waiting Indication (MWI) service to an instant communication client, according to an embodiment of the present invention. For the purposes of illustration, it is assumed that a user subscribes to the MWI service provided by the Service Platform 101, whereby the user is associated with the stations 115–123, and the respective voice mail systems 105–113. Additionally, it is assumed that voice mail messages have be left for the user on voice mail systems 107 and 111. In step 201, the Service Platform 101 obtains the MWI information from the voice mail systems 107 and 111, along with the called number corresponding to the stations 117 and 121 and also optionally the calling number (or other identifier) of the station from which the voice message was received, which can be obtained from Automatic Number Identification (ANI), for example, and would most likely be accessible on the voice mail system. Next, the Service Platform 101 accesses a User Database to examine a profile to determine the IM/IC clients associated with a user (or subscriber), as in step 203. The user profile contains information regarding the voice mail systems to be monitored. Additionally, the profile specifies one or more instant communication clients (or IM clients) that are to receive the MWI information. It is noted that as part of the MWI information, the called numbers are collected.

The platform 101 then determines whether the specified IM client is available (i.e., present, or activated), per step 205. If the IM client is not available, the MWI information, as in step 207, can be stored for later delivery. In step 209, the platform 101 creates a log of the MWI information in a Logging database 303. Thereafter, the Service Platform 101 appropriately forwards the MWI information to the IC/IM clients over the IC service supported data network 127 according to the profile, per step 211. In step 213, the log is created or updated to store the MWI information. Also, the gateway 103, as in step 215, can optionally convey the status or disposition of the MWI function back to the voice mail system (e.g., 105, 107, 109, 111, 113), either leaving the indicator ON or turning the indicator OFF.

The platform 101 advantageously provides convenience for the user by delivering the MWI information to other communication devices (which are supported by a variety of technologies). Provision of MWI in the manner described above can be performed in conjunction with conventional MWI Service or can supplant these conventional methods (which can reduce the cost of telephone stations). The MWI service, according to the present invention, can be extended to a variety of devices, such as hand-held devices, gaming consoles, television sets, and other appliances which either are, or can be made capable of instantiations of instant communications clients (or like software interfaces). Also, the approach, consistent with an embodiment of the present invention, does not require the MWI delivery point to be wired to the device or the network upon which the call is being delivered. For example, a call can terminate at a home on a traditional phone, and the associated MWI information can be displayed on a computer connected to the Internet 103.

Figure 3:
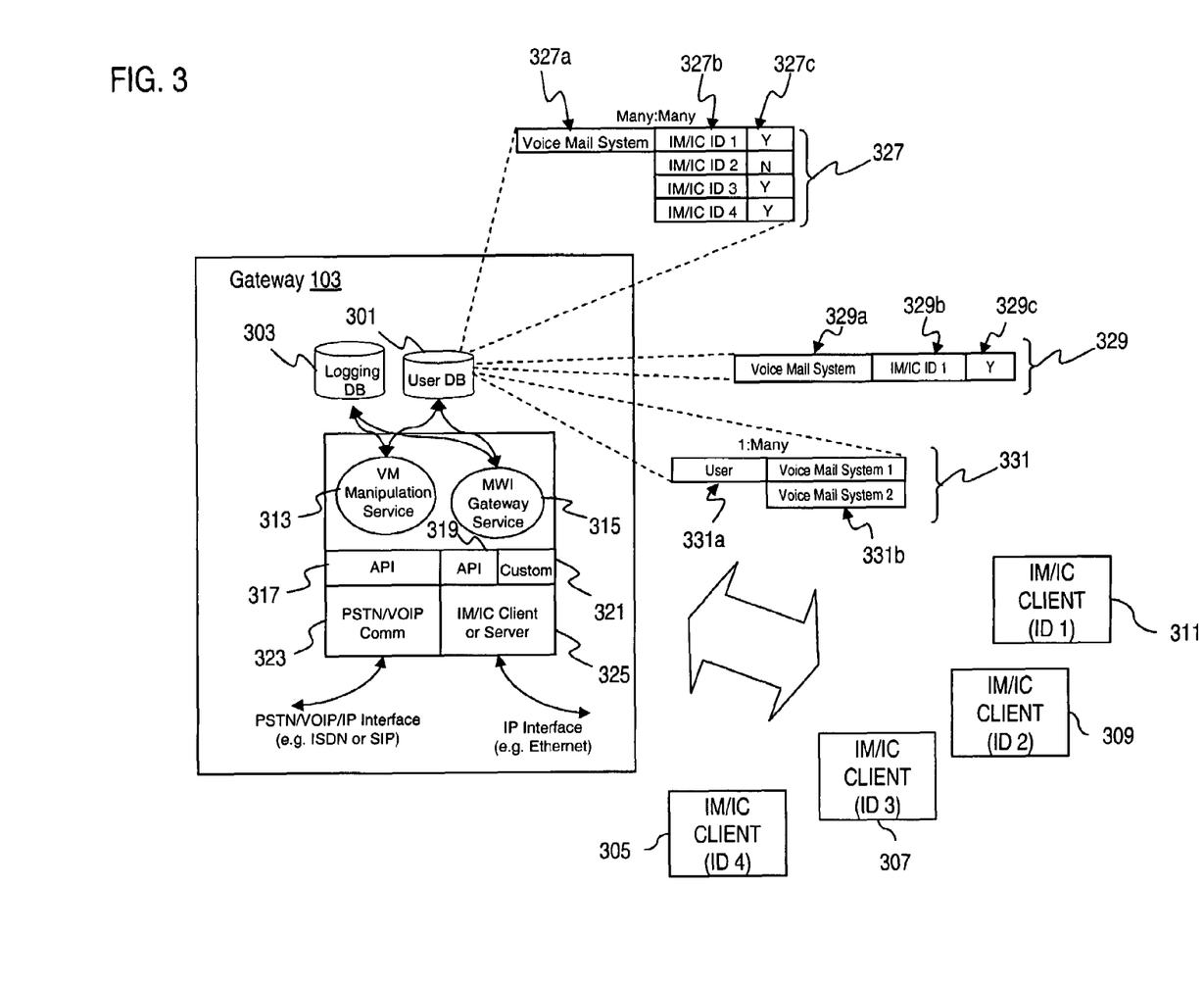
FIG. 3 is a diagram of a gateway used in the system of FIG. 1 for supporting the MWI service.

FIG. 3 is a diagram of a gateway used in the system of FIG. 1 for supporting the MWI service. The gateway 103 maintains a database 301 of users and a database 303 for capturing a log of activity, which can be used for billing and reporting purposes. The user database 301 is used to map a user with one or more IM/IC clients 305–311 to one or more enabled voicemail systems 105–113 corresponding to one or more end user stations (or devices) 115–123. Although the databases 301 and 303 are shown within the gateway 103, it is noted that these databases 301 and 303 can be implemented as separate standalone databases that are externally accessed by the gateway 103. The gateway 103 communicates with the Instant Communication network 127 to deliver MWI information, process MWI requests from the clients 305–311, and handle voice mail manipulation activities.

As seen in FIG. 3, the Service Platform 101 provides a voice mail (VM) manipulation service program 313 for supporting functionalities associated with managing and maintaining voice mail accounts. Such functions may also include instructing delivery or playback of a given voice message or group of messages and turning the message waiting indicator function associated with the voice mail system ON or OFF based on the actions and/or instructions received from a user or administrator of system 101. In addition, the Service Platform 101 includes a MWI gateway service program 315 that collects MWI information for transport to the appropriate IM/IC clients 305–311. The platform 101 also provides the necessary APIs 317, 319, and any custom interfaces 321 (depending on the system to be interfaced) required to communicate with a PSTN/VOIP communication system interface 323 and an IM/IC server (or client) interface 325. The PSTN/VOIP communication system interface 323 communicates with the telephony networks supporting the stations 115–123. The IM/IC client or server interface 313 communicates with the data network 127, which supplies an IC environment.

According to one embodiment of the present invention, the gateway 103 can communicate with an external "presence server," (not shown) as described below. In accordance with various embodiments of the present invention, the IM/IC client (e.g., 305–311) can be determined to be active based on a presence identifier. A presence identifier is an alphanumeric handle of a user or party that can be used to query the server (referred to as a "presence server") for determining a communications state of the user. The communications state indicates at least whether or not the party is available to accept delivery of preferably real-time communications. Examples of real-time communications include instant messages, chat messages, voice-enabled chat, Internet Relay Chat (IRC), voice over Internet Protocol (IP), and any other messages delivered at a rate capable of supporting an interactive session. In contrast to the store-and-forward approach of electronic mail, the delivery of communications indicated in the communications state is typically immediate, in which a message in the communication is dropped if there is an obstacle to delivery. Accordingly, a presence identifier can include any of a screen name, a handle, an electronic pseudonym, a chat identifier, and an instant message identifier.

The presence server can be implemented as a computer system that furnishes the presence services described in Internet Engineering Task Force (IETF) Reference for Comment (RFC) 2778, which is incorporated herein by reference in its entirety, or similar specifications and may include those popular presence servers supplied by AMERICA ONLINE™, YAHOO™, etc. Typically, users who wish to make their on-line presence known register their communication state with the presence server. Specifically, when a user logs in somewhere on the Internet, corporate intranets, or other similar networks, the user registers with the presence server that the user is available, and when the user logs out, the user registers with the presence server that the user is unavailable.

As mentioned above, the gateway 103 can utilize the Logging (or Call Log) database 303 (or a similar database) to store for later or delayed delivery of MWI information that the system 101 is unable to deliver to a non-present or unavailable user. This capability permits maintenance of historical records. The Logging database 303, thus, permits the ability to mark a MWI record as "delivered" (or other states). Furthermore, the database 303 can support appending supplemental information, such as timestamps or other information (e.g., called number), as well as advertisements.

As noted, the platform 101 supports a many-to-many relationship between the voice mail systems 105–113 and the IM/IC clients 115–123. In this example, the User Database 301 maintains a profile table 327 with a column 327a for the Voice Mail System, a column 327b for the IM/IC Client Identifiers, and a column 327c to designate whether the particular IM/IC client should receive the MWI information. With this profile, when the MWI information is obtained corresponding to a voice mail message stored in the Voice Mail System in column 327a, the MWI information would be forwarded to the IM clients 305, 307, and 311 corresponding to clients 1, 3, and 4 respectively within the column 327b. However, the IM/IC client 309 would not receive the MWI information. It is noted that the IM/IC client 309 may in the future be designated to receive the MWI information, upon appropriate modification of the user profile. Furthermore, the profile within the User Database 301 can also be based on a schedule, whereby the activation of a particular Voice Mail System or IM/IC client can be schedule driven.

Additionally, a different Voice Mail System 2 can be associated with an IM/IC client that is also associated with Voice Mail System 1. A table entry 329 thus includes columns 329a–329c to store the following information: voice mail system, IM/IC client, and whether the IM/IC client should receive the MWI information.

As further seen in FIG. 3, an association between a user and one or more voice mail systems is supported, as in table entry 331. This association can be a one to many relationship; a user column 331a and a Voice Mail System column 331b.

FIG. 4 is a diagram of an exemplary voice mail indicator message used to support the MWI service, according to an embodiment of the present invention. As shown, a Voice Mail Indicator message (which can be a packet) 401 includes an IM/IC ID field 401a, and a record size field 401b, and one or more Boolean Indicator fields 401c. These fields 401c correspond to the particular voice mail systems involved in the MWI gateway service 403. The values of the Boolean Indicator fields 401c specify whether voicemails are present within the respective voice mail systems 405, 407. In this example, the system 405 can be an intermediate system, and the system 407 is an IM/IC client (e.g., 305, 307, 309, and 311).

Figure 5:
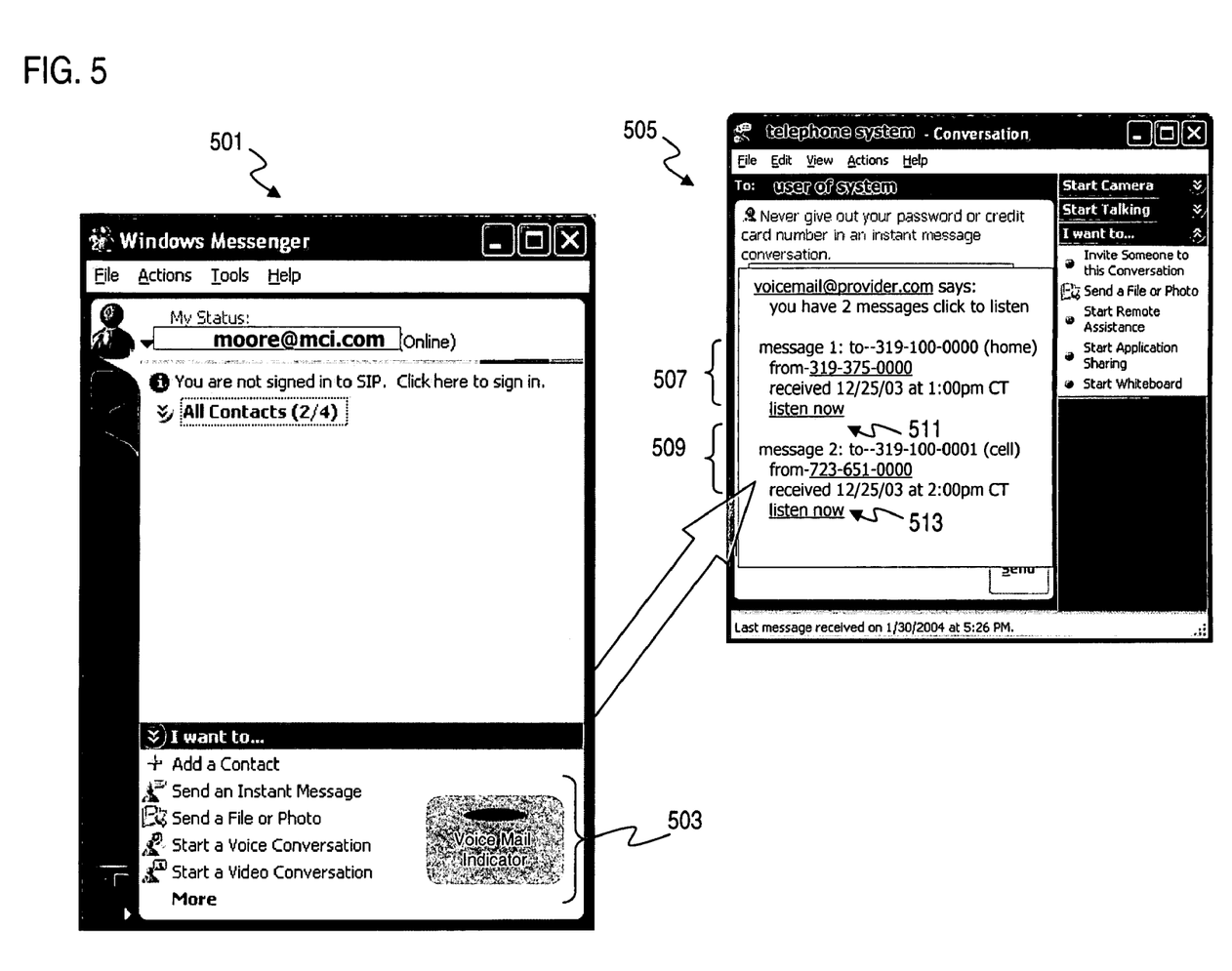
FIG. 5 is a diagram of an exemplary common instant communication client in support of the MWI service, according to an embodiment of the present invention.

FIG. 5 is a diagram of an exemplary common instant communication client in support of the MWI service, according to an embodiment of the present invention. In this example, an IM/IC client supports a graphical screen 501 that shows a Voice Mail Indicator icon 503, which when selected invokes a dialog screen 505. The Voice Mail Indicator icon 503 may be "lighted" by system 101 to indicate the presence of voicemail on one or more systems. This is done through a Voice Mail Indicator message 401 in FIG. 4. This message or packet is sent via a communications network from the MWI gateway service 403 to receiving software on either the end IM/IC Client 407 or on an intermediate system 405 (such as a web server) that is accessible to the end client 407 that causes one or more voice mail indicators 503 to be set to "ON" or "OFF." This screen 505 displays the MWI information, including the called numbers along with the time stamp, as two entries 507 and 509 corresponding to Message 1 left on the voice mail system (e.g., system 105) serving the home number and Message 2 left on the voice mail system (e.g., system 111) serving the cell number. Further, links 511 and 513 are provided to the user, whereby the user can listen to the voice mail messages placed to the respective called numbers (e.g., home number and cell number). In an exemplary embodiment, upon selection of one of these links 511 and 513, the voice mail message is played as an audio file, which may have been retrieved in advance by the platform 101 from the appropriate voice mail system. Alternatively, the platform 101 can obtain the voice mail message in real-time.

Although not shown, it is contemplated that the user can access and manipulate a log of the MWI information through web-based access methods, as supported by the web server 125 (FIG. 1).

Thus, the platform 101 supports the capability to time/date stamp the MWI information. It is also noted that the platform 101 can be configured to provide the user with the ability to respond to the MWI information (and other telephony information) from an instant communication client with instructions back to the telephony network 103 as to subsequent handling of a voice mail or to call back to the number associated with the voice mail or call the voice mail system itself. Additionally, the screen 505 can be designed to associate other useful information with the calling or called number and display to user (for example, identifying a number as cellular, home, or business, as well as inclusion of information related to the priority of the call).

It is contemplated that the information found in the screen 405 can be displayed by any type of device with connectivity to the Service Platform 101. By way of example, a gaming console with connectivity to a public data network (e.g., the Internet) can access the platform 101 because of the platform's web access capabilities, and consequently, can display the MWI information on a television.

Moreover, the Service Platform 101 provides a convenient mechanism for modifying the user profile, as next described.

Figure 6:
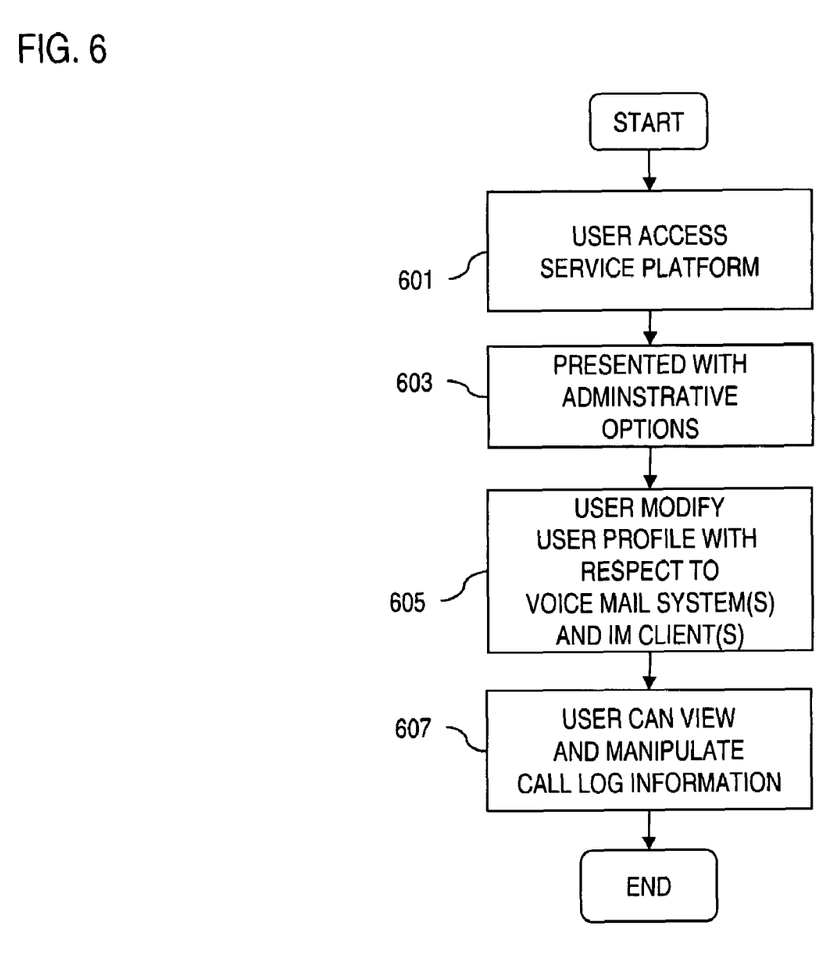
FIG. 6 is a flowchart of an administrative process for modifying a profile stored in the user database of FIG. 1.

FIG. 6 is a flowchart of an administrative process for modifying a profile stored in the user database of FIG. 3. In this example, a user utilizes the host 129 to access the Service Platform 101, per step 601. The login process can be based on conventional techniques of authentication and password systems. In step 503, the Service Platform 101, upon verifying the user, can present a menu of options respecting various administrative functions, such as account and billing information, and profile creation and update. For example, the user can add more voice mail systems if the user wishes to be notified of messages left on those systems. Also, the user may seek to change a voice mail system, if the user, for example, changes residence, or occupation. Further, the user may want to change a particular IM/IC client for receipt of the MWI formation. To effect any one of these changes, the user can modify the user profile, as in step 605. Additionally, the user can optionally view and/or modify the Log information (step 507).

It is noted that although the above example is described such that the user is both the "subscriber" to the MWI service and the person authorized to modify the profile, it is noted that a person other than the subscriber can be authorized to alter the profile stored in the User Database 301.

As evident from the above discussion, the platform 101 can supply convenience services to users (both consumer class users via a public IC system, as well as business class users via a private IC system). With delivery of the MWI information to IC network 127, this in effect provides a viable mechanism for widespread deployment of useful and cost effective devices. Among the other advantages, the MWI service represents a significant revenue opportunity for service providers in that users are already accustomed to this feature in the telephony arena.

Figure 7:
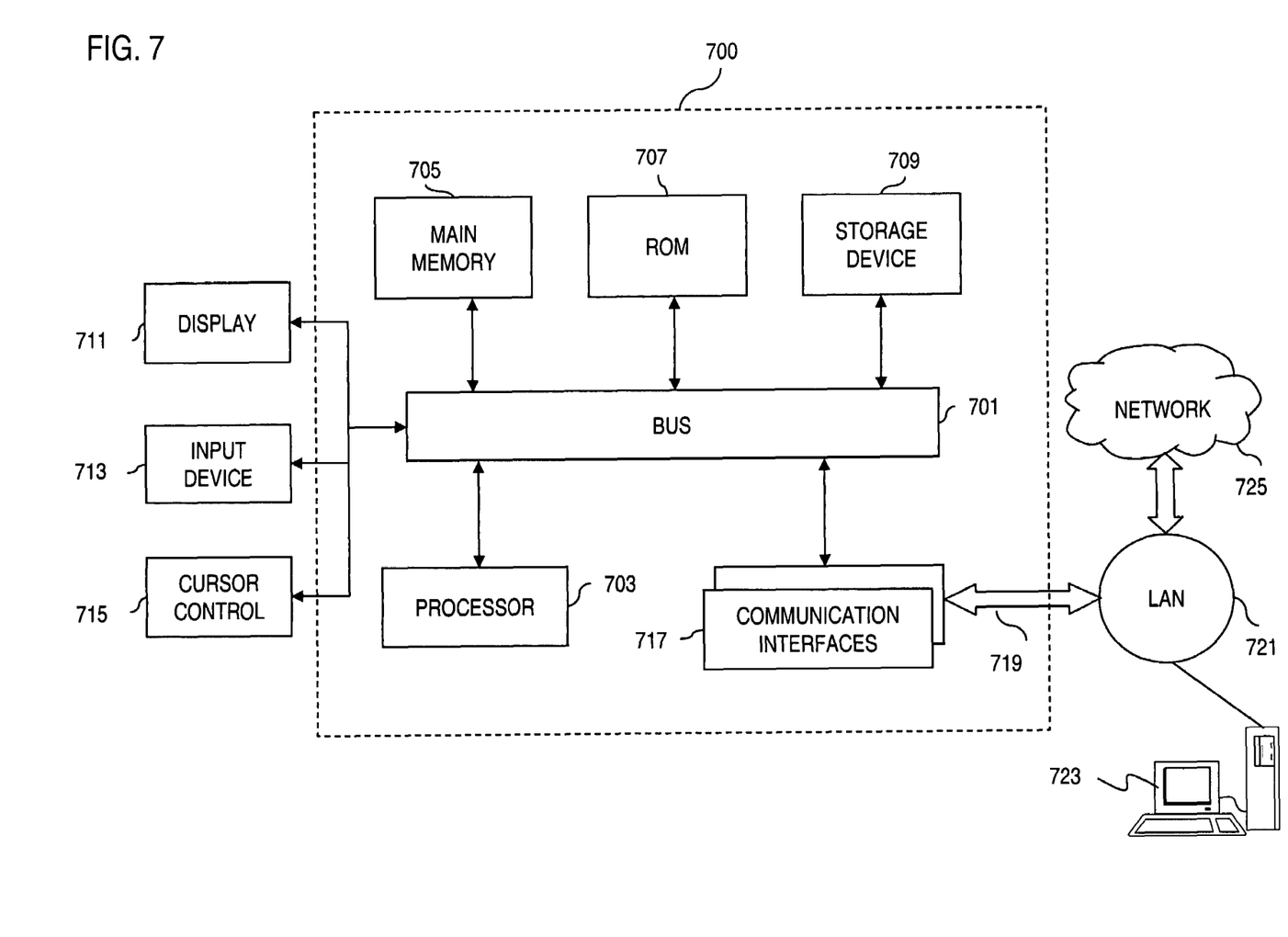
FIG. 7 is a diagram of a computer system that can be used to implement an embodiment of the present invention.

FIG. 7 illustrates a computer system 700 upon which an embodiment according to the present invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the screens 501, 505 of FIG. 5 along with the process of FIG. 6 can be provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g., for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g., a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the present invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 705 for execution. Such a medium may take many forms, including but not limited to non-volatile media, volatile media, and transmission media.

Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for supporting telephony services over a data network, the method comprising:
   retrieving message waiting indication information from a plurality of voice mail systems designated by a user, wherein each of the message waiting indication information specifies existence, within the respective voice mail system, of a voice mail message for the user;
   determining an instant communication client of the user; and
   forwarding the message waiting indication information over the data network to the instant communication client for display, wherein the instant communication client displays the plurality of message waiting indication information concurrently.

2. A method according to claim 1, wherein the instant communication client is among a plurality of instant communication clients, the method further comprising:
   forwarding the message waiting indication information to one or more of the instant communication clients.

3. A method according to claim 1, further comprising:
   accessing a user database for a profile of the user, wherein the profile specifies the voice mail systems and the instant communication client for displaying the message waiting indication information.

4. A method according to claim 3, further comprising:
   receiving a request to modify the profile of the user; and
   modifying the profile based on the request.

5. A method according to claim 1, wherein the instant communication client is resident on one of a computer system, a Personal Digital Assistant (PDA), a cellular phone, a gaming console, and a web appliance.

6. A method according to claim 1, the method further comprising:
   receiving an identifier associated with a called station served by one of the voice mail systems; and
   forwarding the identifier to the instant communication client, wherein the instant communication client displays the identifier along with the message waiting indication information.

7. A method according to claim 6, wherein the identifier is derived from one of a Dialed Number Identification Service (DNIS) number and Automatic Number Identification (ANI).

8. A method according to claim 1, the method further comprising:
   determining whether the instant communication client is available; and
   if the instant communication client is not available, storing the message waiting indication information for later delivery.

9. A method according to claim 1, the method further comprising:
   appending supplemental information including one of time stamp information and advertisement information to the message waiting indication information.

10. A method according to claim 1, the method further comprising:
    associating a user with the voice mail systems; and
    associating the user with one or more instant communication clients including the instant communication client.

11. A method according to claim 1, the method further comprising:
    generating a command message to one of the voice mail systems to activate or deactivate message waiting indication function of the one voice mail system.

12. A method according to claim 1, the method further comprising:
    generating a voice mail indicator message to notify a computing system hosting the instant communication client or an intermediate system, wherein the voice mail indicator message includes an identification field for the instant communication client and one or more fields indicating presence of voicemail in the respective voice mail systems.

13. A computer-readable medium carrying one or more sequences of one or more instructions for supporting telephony services over a data network, the one or more sequences of one or more instructions including instructions which, when executed by one or more processors, cause the one or more processors to perform the steps of:
    retrieving message waiting indication information from a plurality of voice mail systems designated by a user, wherein each of the message waiting indication information specifies existence, within the respective voice mail system, of a voice mail message for the user;
    determining an instant communication client of the user; and
    forwarding the message waiting indication information over the data network to the instant communication client for display, wherein the instant communication client displays the plurality of message waiting indication information concurrently.

14. A computer-readable medium according to claim 13, wherein the instant communication client is among a plurality of instant communication clients, the computer-readable medium further including instructions for causing the one or more processors to perform the step of:
forwarding the message waiting indication information to one or more of the instant communication clients.

15. A computer-readable medium according to claim 13, the computer-readable medium further including instructions for causing the one or more processors to perform the step of:
accessing a user database for a profile of the user, wherein the profile specifies the voice mail systems and the instant communication client for displaying the message waiting indication information.

16. A computer-readable medium according to claim 15, the computer-readable medium further including instructions for causing the one or more processors to perform the steps of:
receiving a request to modify the profile of the user; and modifying the profile based on the request.

17. A computer-readable medium according to claim 13, wherein the instant communication client is resident on one of a computer system, a Personal Digital Assistant (PDA), a cellular phone, a gaming console, and a web appliance.

18. A computer-readable medium according to claim 13, the computer-readable medium further including instructions for causing the one or more processors to perform the steps of:
receiving an identifier associated with a called station served by one of the voice mail systems; and
forwarding the identifier to the instant communication client, wherein the instant communication client displays the identifier along with the message waiting indication information.

19. A computer-readable medium according to claim 18, wherein the identifier is derived from one of a Dialed Number Identification Service (DNIS) number and Automatic Number Identification (ANI).

20. A computer-readable medium according to claim 13, the computer-readable medium further including instructions for causing the one or more processors to perform the steps of:
determining whether the instant communication client is available; and
if the instant communication client is not available, storing the message waiting indication information for later delivery.

21. A computer-readable medium according to claim 13, the computer-readable medium further including instructions for causing the one or more processors to perform the step of:
appending supplemental information including one of time stamp information and advertisement information to the message waiting indication information.

22. A computer-readable medium according to claim 13, the computer-readable medium further including instructions for causing the one or more processors to perform the steps of:
associating a user with the voice mail systems; and
associating the user with one or more instant communication clients including the instant communication client.

23. A computer-readable medium according to claim 13, the computer-readable medium further including instructions for causing the one or more processors to perform the step of:
generating a command message to one of the voice mail systems to activate or deactivate message waiting indication function of the one voice mail system.

24. A computer-readable medium according to claim 13, the computer-readable medium further including instructions for causing the one or more processors to perform the step of:
generating a voice mail indicator message to notify a computing system hosting the instant communication client or an intermediate system, wherein the voice mail indicator message includes an identification field for the instant communication client and one or more fields indicating presence of voicemail in the respective voice mail systems.

25. A system for supporting telephony services over a data network, the system comprising:
a gateway configured to retrieve message waiting indication information from a plurality of voice mail systems designated by a user, wherein each of the message waiting indication information specifies existence, within the respective voice mail system, of a voice mail message for the user, the gateway determining an instant communication client of the user; and
a server configured to forward the message waiting indication information over the data network to the instant communication client for display, wherein the instant communication client displays the plurality of message waiting indication information concurrently.

26. A system according to claim 25, wherein the instant communication client is among a plurality of instant communication clients, the message waiting indication information being forwarded to one or more of the instant communication clients.

27. A system according to claim 25, further comprising:
a user database for storing a profile of the user, wherein the profile specifies the voice mail systems and the instant communication client for displaying the message waiting indication information.

28. A system according to claim 27, wherein the server receives a request to modify the profile of the user, and the profile is modified based on the request.

29. A system according to claim 25, wherein the instant communication client is resident on one of a computer system, a Personal Digital Assistant (PDA), a cellular phone, a gaming console, and a web appliance.

30. A system according to claim 25, wherein the gateway receives an identifier associated with a called station served by one of the voice mail systems, the identifier being forwarded to the instant communication client which displays the identifier along with the message waiting indication information.

31. A system according to claim 30, wherein the identifier is derived from one of a Dialed Number Identification Service (DNIS) number and Automatic Number Identification (ANI).

32. A system according to claim 25, wherein the gateway determines whether the instant communication client is available, and if the instant communication client is not available, the gateway stores the message waiting indication information for later delivery.

33. A system according to claim 25, wherein the gateway appends supplemental information including one of time stamp information and advertisement information to the message waiting indication information.

34. A system according to claim 27, wherein a user is associated with one or more instant communication clients.

35. A system according to claim 25, wherein the gateway is further configured to generate a command message to one of the voice mail systems to activate or deactivate message waiting indication function of the one voice mail system.

36. A system according to claim 25, wherein the gateway is further configured to generate a voice mail indicator message to notify a computing system hosting the instant communication client or the server, wherein the voice mail indicator message includes an identification field for the instant communication client and one or more fields indicating presence of voicemail in the respective voice mail systems.

37. A method for supporting telephony services over a data network, the method comprising:

aggregating message waiting indication information from a plurality of voice mail systems for notifying a user of presence of a plurality of voice mail messages resident on the voice mail systems; and transmitting a notification message over the data network to an instant communication client based upon the aggregated message waiting indication information, wherein the notification message concurrently specifies the presence of the voice mail messages to the instant communication client.

38. A server for supporting telephony services over a data network, the method comprising:

means for aggregating message waiting indication information from a plurality of voice mail systems for notifying a user of presence of a plurality of voice mail messages resident on the voice mail systems; and means for transmitting a notification message over the data network to an instant communication client based upon the aggregated message waiting indication information, wherein the notification message concurrently specifies the presence of the voice mail messages to the instant communication client.

* * * * *